US012074372B2

(12) United States Patent
Hallivuori

(10) Patent No.: US 12,074,372 B2
(45) Date of Patent: Aug. 27, 2024

(54) METHOD AND APPARATUS FOR ANTENNA WITH NOTCHED MULTI-ELEMENT REFLECTOR

(71) Applicant: NOKIA SOLUTIONS AND NETWORKS OY, Espoo (FI)

(72) Inventor: Juha Samuel Hallivuori, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/479,059

(22) Filed: Sep. 20, 2021

(65) Prior Publication Data

US 2022/0094069 A1 Mar. 24, 2022

(30) Foreign Application Priority Data

Sep. 23, 2020 (FI) ..................................... 20205921

(51) Int. Cl.
*H01Q 15/16* (2006.01)
*H01Q 1/24* (2006.01)
(Continued)

(52) U.S. Cl.
CPC ......... *H01Q 15/166* (2013.01); *H01Q 15/002* (2013.01); *H01Q 15/165* (2013.01);
(Continued)

(58) Field of Classification Search
CPC .. H01Q 15/166; H01Q 15/002; H01Q 15/165; H01Q 19/17; H01Q 19/18; H01Q 1/246
See application file for complete search history.

(56) References Cited

U.S. PATENT DOCUMENTS 4,482,897 A 11/1984 Dragone et al.
5,202,700 A 4/1993 Miller
(Continued)

FOREIGN PATENT DOCUMENTS

CN 103259100 A 8/2013
CN 110140257 A 8/2019
(Continued)

OTHER PUBLICATIONS

Extended European Search Report for European Application No. 21197592.5 dated Feb. 14, 2022, 11 pages.
(Continued)

*Primary Examiner* — Hoang V Nguyen
*Assistant Examiner* — Yonchan J Kim
(74) *Attorney, Agent, or Firm* — ALSTON & BIRD LLP

(57) ABSTRACT

An apparatus is provided that includes: a multi-element reflector, each element comprising a concave reflective surface, the curvature of each element and focal distance of each element being common, the concave reflective surface of each element being configured to steer a radio-frequency beam in a different direction to that of the other elements; and a directional antenna feed, configurable to direct a beam towards each element of the multi-element reflector and positionable to be concurrently spaced said common focal distance from all of the elements of the multi-element reflector. One or more mechanisms are also provided by which, for example, a commercially viable millimeter wave base station can be realised. In particular, antenna arrangements are provided which support a field of view which facilitates establishment and maintenance of an effective communication link between a base station and a user with a desired level of reliability.

20 Claims, 11 Drawing Sheets

(51) Int. Cl.
*H01Q 15/00* (2006.01)
*H01Q 19/17* (2006.01)
*H01Q 19/18* (2006.01)

(52) U.S. Cl.
CPC ............. *H01Q 19/17* (2013.01); *H01Q 19/18* (2013.01); *H01Q 1/246* (2013.01)

(56) References Cited

U.S. PATENT DOCUMENTS

| | | | | |
|---|---|---|---|---|
| 5,977,926 | A | 11/1999 | Gilger | |
| 7,280,081 | B2 | 10/2007 | Mahr | |
| 7,961,153 | B2 | 6/2011 | Haziza | |
| 9,246,232 | B2 | 1/2016 | Sauleau et al. | |
| 9,698,491 | B2 | 7/2017 | Lee | |
| 10,566,698 | B2 | 2/2020 | Retter et al. | |
| 2004/0085254 | A1 | 5/2004 | Petersson et al. | |
| 2007/0035461 | A1 | 2/2007 | Nagai | |
| 2016/0156106 | A1 | 6/2016 | Lee | |
| 2017/0222327 | A1* | 8/2017 | Retter | H01Q 15/16 |
| 2018/0040962 | A1 | 2/2018 | Lee | |
| 2018/0131101 | A1* | 5/2018 | Evtyushkin | H01Q 3/30 |
| 2020/0274611 | A1* | 8/2020 | Mendelsohn | H01Q 19/17 |
| 2020/0301041 | A1* | 9/2020 | Partee | G01V 8/005 |

FOREIGN PATENT DOCUMENTS

| | | | |
|---|---|---|---|
| CN | 110571531 | A | 12/2019 |
| JP | 2009055245 | A | 3/2009 |
| JP | 2019161629 | A | 9/2019 |

OTHER PUBLICATIONS

Nesic et al., "Printed Antenna Arrays with Cylindrical Parabolic Reflector", 20th Telecommunications Forum TELFOR 2012, (Nov. 20-22, 2012), 4 pages.

Fan et al., "Wideband Horizontally Polarized Omnidirectional Antenna With a Conical Beam for Mullimeter-Wave Applications", IEEE Transactions on Antennas and Propagation, vol. 66, No. 9, (Sep. 2018), 12 pages.

Office Action for Finland Application No. 20205921 dated Dec. 4, 2020, 8 pages.

Office Action for Chinese Application No. 202111112263.8 dated Jan. 11, 2024, 10 pages.

Office Action for Chinese Application No. 201111112263.8 dated Jan. 11, 2024, 10 pages.

* cited by examiner

METHOD AND APPARATUS FOR ANTENNA WITH NOTCHED MULTI-ELEMENT REFLECTOR

CROSS-REFERENCE TO RELATED APPLICATIONS

This application claims priority to Finnish Application No. 20205921, filed Sep. 23, 2020, the entire contents of which are incorporated herein by reference.

TECHNOLOGICAL FIELD

Various example embodiments relate to antenna apparatus comprising a multi-element reflector.

BACKGROUND

Wireless communication systems are known. Typically users of such networks require access to high-quality services at any time and location and hence create substantial traffic. Wireless communication networks are adapting to provide sufficient capacity and satisfactory data rates. One possible adaptation comprises increasing available frequency bandwidth, for example, by using regions of the electromagnetic spectrum which may not have typically been used for cellular radio communication. Such regions include, for example, a "Super High Frequency" SHF region (3-10 GHz), 5G-New Radio bands and millimetre-wave (mm-wave) frequencies.

FSPL (Free Space Path Loss) increases as distance increases between a transmit antenna and a receive antenna and/or the FSPL increases as operational frequency increases (or as wavelength decreases). As a result, use of high frequencies typically results in high path loss, together with deep shadowing because of weak diffraction reflection. Path loss can be compensated for by providing a signal at high gain, and/or providing directed beam energy.

Providing a practical deployment suited to a frequency subject to significant path loss and which supports increased user demands presents various challenges. It is desired to address some of those challenges.

BRIEF SUMMARY

The scope of protection sought for various embodiments of the invention is set out by the independent claims. The examples and features, if any, described in this specification that do not fall under the scope of the independent claims are to be interpreted as examples useful for understanding various embodiments of the invention.

According to various, but not necessarily all, embodiments of the invention there is provided an apparatus, comprising: a multi-element reflector, each element comprising a concave reflective surface, the curvature of each element and focal distance of each element being substantially common, the concave reflective surface of each element being configured to steer a radio-frequency beam in a different direction to that of the other elements; and a directional antenna feed, configurable to direct a beam towards each element of the multi-element reflector and positionable to be concurrently spaced said substantially common focal distance from all of the elements of the multi-element reflector.

The apparatus may be such that the reflector elements are configured, dimensioned or formed in a manner which is reflective to radio-frequency beams used to support communication networks.

The apparatus may be such that the directional antenna feed comprises a plurality of antenna elements configured to form and antenna feed.

The apparatus may be such that the directional antenna feed comprises a one-dimensional array of antenna elements.

The apparatus may be such that the directional antenna comprises a two-dimensional feed array of antenna elements.

The apparatus may be such that the directional antenna comprises a multi-dimensional feed array of antenna elements.

The apparatus may be such that each of the multi-element reflector elements comprises a parabolic reflector.

The apparatus may be such that the parabolic reflectors each have the same focal distance and the directional antenna feed is located that focal distance away from each of the parabolic reflectors.

The apparatus may be such that the multi-element reflector is dimensioned to redirect a radio-frequency beam having a frequency above 3 GHz received from the directional antenna feed.

The apparatus may be such that the multi-element reflector is dimensioned to redirect a radio-frequency beam having a frequency between 30 and 300 GHz received from the directional antenna feed.

The apparatus may be such that the multi-element reflector is dimensioned to redirect a radio-frequency beam having a frequency between 3 and 300 GHz received from the directional antenna feed.

The apparatus may be such that the elements are located immediately adjacent each other.

The apparatus may be such that the concave reflective surfaces of adjacent elements are located to result in an overlap region.

The apparatus may be such that the elements of the multi-element reflector are configured to be independently moveable.

The apparatus may be such that the elements of the multi-element reflector are configured such that adjacent elements do not touch each other in the overlap region.

The apparatus may be such that one of the concave reflective surfaces of adjacent elements of at least one reflective element in the overlap region includes one or more openings through which the concave reflective surface of the other element may be accessed.

The apparatus may be such that the overlap region is elongate and the openings extend along the overlap region.

The apparatus may be such that the overlap region is elongate and the openings are concentrated in a central region of the overlap region.

The apparatus may be such that the overlap region is elongate and the openings are uniformly distributed within the overlap region.

The apparatus may be such that the openings comprise one or more of: slots, apertures or notches.

The apparatus may be such that the openings comprise one or more open-ended slots, apertures or notches.

The apparatus may be such that the openings comprise one or more apertures formed in a reflector element.

The apparatus may be such that the openings are substantially uniform.

The apparatus may be such that the reflector elements are configured to steer a beam in different vertical directions.

The apparatus may be such that the reflector elements are configured to steer a beam in different horizontal directions.

The apparatus may be such that a distance between the multi-element reflector and the directional feed is adjustable.

The apparatus may be such that the apparatus further comprises a motor, configured to rotate the multi-element reflector and directional feed relative to a surrounding environment.

According to a further embodiment of the invention there may be provided a method, comprising: providing a multi-element reflector, each element comprising a concave reflective surface, the curvature of each element and focal distance of each element being substantially common; configuring each element such that the concave reflective surface of each element steers a radio frequency beam in a different direction to that of the other elements; providing a directional antenna feed, configurable to direct a beam towards each element of the multi-element reflector; and positioning the directional antenna feed such that it is concurrently spaced said substantially common focal distance from all of the elements of the multi-element reflector.

According to a further embodiment of the invention there may be provided an electronic device comprising the apparatus described above.

The electronic device may comprise at least one of: a communication network base station, an Internet of Things (IoT) device, a router, an access node, a wireless electronic communication device or any similar device.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Figure 1:
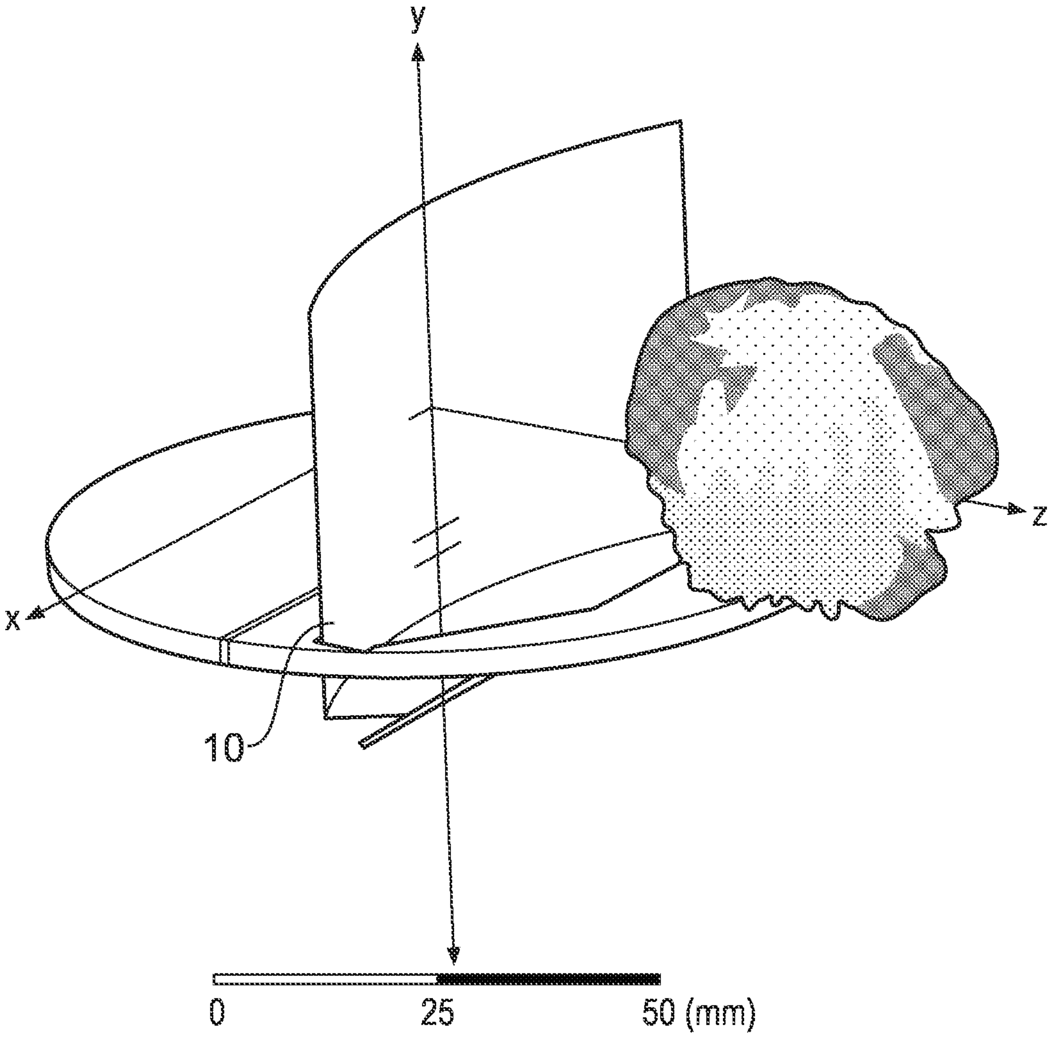
FIG. 1 illustrates schematically an antenna which is substantially planar in the vertical direction, together with resulting polarization and gain plots.
Figure 1:
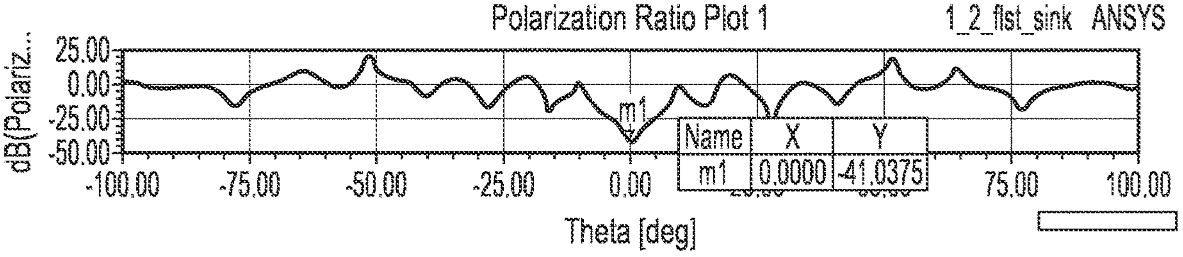
Figure 1:
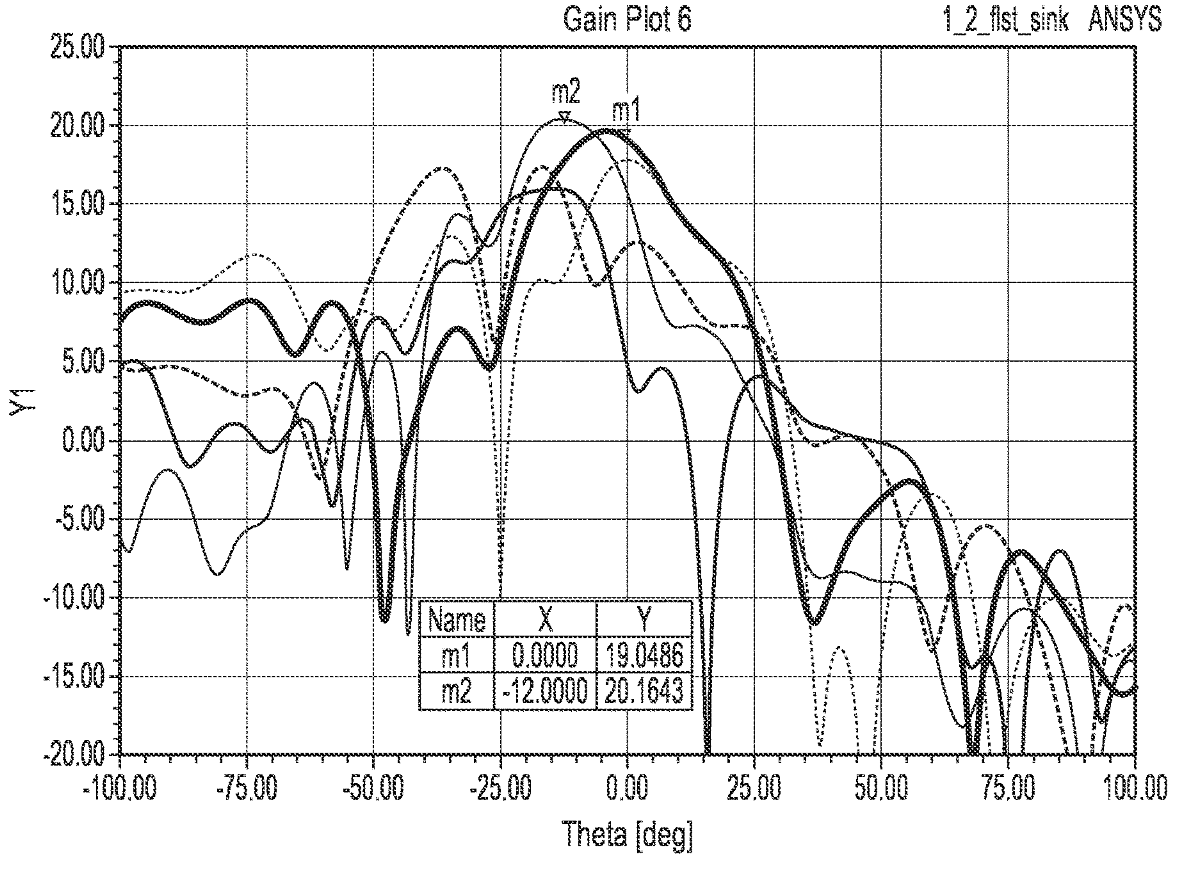

Before discussing the example embodiments in any more detail, first an overview will be provided. As described above, increasing demand on wireless communication networks has led to adaptation and development, including consideration of traditionally unused portions of radio spectrum to support communication. One particular area of development relates to use of frequencies outside those which may typically have been used in support of cellular communication. Use of frequencies above 3 GHz may be such that their use is subject to significant path loss. FSPL (Free Space Path Loss) increases as operational frequency increases (or as wavelength decreases). Use of Extremely High Frequency (EHF) frequencies (30-300 GHz) and some regions of the Ultra High Frequency (UHF) and Super High Frequency (SHF) bands may result in particular issues related to path loss.

One of the issues with, for example, millimetre wave communication techniques is that at such high frequencies, high path loss occurs. One mechanism to overcome high path loss is transmission at high power. Where high power transmission may be difficult or inappropriate, it is possible to ensure that transmissions are made by an antenna operating to have a narrow beam so that the energy within the beam is very directional and the radiation pattern has a much greater peak antenna gain relative to an omnidirectional antenna radiation pattern.

One possible application for millimetre wave communication networks is that of provision of an alternative to a traditional wired or optical broadband connection. That is to say, it is possible that millimetre wave 5G deployments can be used to provide one or more cells at a customer premises which supports very high and/or very reliable data transmission between one or more base stations and users within a region of coverage provided or supported by such a base station. It will be appreciated that when providing a region of coverage or cell of coverage, a base station may be required to provide a cell which has, for example, 180°-360° coverage in the horizontal plane and at least 90° of protection of coverage in the vertical plane, thereby providing users having network connectable devices located within that field of view or coverage area with a strong communication link with a base station.

It will be appreciated that use of narrow beams or directional beams to support communication with users within a potential region of coverage using microwave millimetre wave technology may be difficult. Narrow beam use results in a small area in which communication links with users can be established and maintained, but are required in relation to mmW approaches to counteract high path loss and shadowing effects in electromagnetic wave propagation. It will be appreciated that a very focused or directional beam operates to concentrate the energy and ensure a reliable and strong communication link between communicating entities can be established. Such a focused beam can be obtained by careful placement, for example, of a reflector and feed. In particular, a feed may be placed a focal distance away from a reflector, so that the resulting beam is narrow. If the feed is slightly misplaced, a slightly wider unfocused beam may be generated, which can have advantages, up to the point that the energy in the broader beam is insufficient to counteract the high path loss and shadowing effects associated with mmW wave propagation.

It is possible to provide an active antenna array which allows for, for example, dynamic, or semi static, beamforming and therefore directed communication between a base station and one or more users, but such technology is expensive and too complex to support general distribution in a domestic or commercial environment.

Arrangements described seek to provide one or more mechanisms by which a commercially viable high frequency, for example, millimetre wave, static electronic device can be provided. In particular, arrangements described may provide antenna arrangements which support communication using frequencies where free space path loss is of significance and, for example, in which use of narrow beams to overcome such path loss occurs. Antenna arrangements described may provide a field of view which facilitates establishment and maintenance of an effective communication link between, for example, a mmW static electronic device and a user with a desired level of reliability.

It is possible to arrange an antenna reflector such that it results in a narrow directed beam emanating from antenna apparatus. One possible such reflector arrangement comprises a parabolic reflector. Use of a parabolic reflector can ensure that any beam emanating from an antenna apparatus is narrow, as a result of the focusing induced by the parabolic reflector, and therefore the energy within the beam is concentrated. It will be appreciated that any appropriately shaped reflector may act to focus or concentrate a wave emanating from a feed, and that a parabolic reflector is one example of shaping which can focus a wave.

FIG. 1 illustrates schematically one possible antenna reflector and resulting polarization and gain plots emanating from such a reflector when used with a millimetre wave feed. In the example shown in FIG. 1, a reflector 10 is shaped such that it is parabolic in the X-Z plane and substantially planar in the Y direction. If the reflector 10 is appropriately placed near an antenna feed (not shown in FIG. 1), the reflector provides vertical scanning which has a virtually non-existent vertical field of view. That is to say, the spread in the Y direction of mmW waves from the feed as spread by the reflector is not significant. Consequently, a user, for example located 10° above the reflector, may not be able to receive radiation from the reflector and, in the case of use for wireless communication, a user would not see a cell of mmW coverage supported by a base station having such a reflector as part of antenna apparatus.

The parabolic nature of the reflector 10 in the X-Z plane allows for a mmW beam emanating from the antenna to be focused and substantially narrowed in the X-Z direction compared to the wave emanating from a feed. As a result, a user located or may need to be relatively accurately positioned with respect to the narrowed focused beam (the a main axis (typically zero degrees in the X-Z plane) of the reflector) in order to see a communication coverage area supported by a base station having such an antenna.

Figure 2:
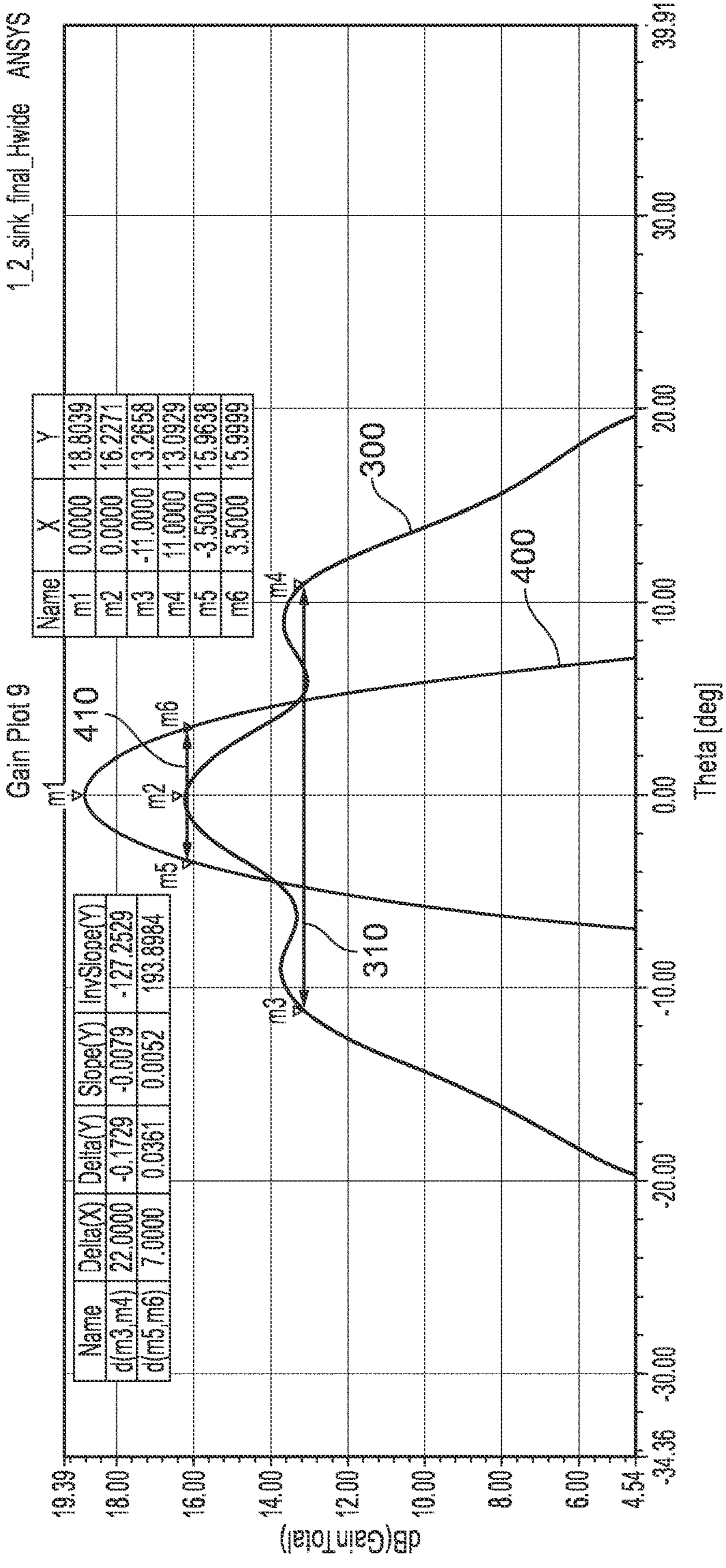
FIG. 2 illustrates an example gain plot for an antenna operating in a narrow mode and a wide mode.

FIG. 2 illustrates results of one possible arrangement which allows use of a focusing reflector, for example, a parabolic reflector such as that shown in FIG. 1, to provide a wider beam.

One way in which a wider beam can be achieved is by adjusting a distance between an antenna feed (not shown in FIG. 1) and a reflector 10. By moving an antenna feed closer to the reflector or the reflector closer to the antenna feed, it is possible to take the spread of a beam emanating from the antenna to cover approximately 22°, rather than operating in a narrow mode, in which case only 7° may be covered.

That is to say, it is possible to defocus a beam emanating from the antenna, by moving the antenna feed and reflector such that their separation is less than substantially focal distance (set by curvature of a reflector) separation.

It will be appreciated that if operating in "wide mode" illustrated by plot 300 in FIG. 2, the antenna feed and reflector are spaced apart less than the focal distance. If operating in "narrow mode" illustrated by plot 400 in FIG. 2, the antenna feed and reflector are spaced apart approximately by the focal distance.

Whilst operating in wide mode, the gain offered to users within the coverage area may not be as advantageous as for a narrow mode beam. As a consequence, it may be advantageous to adjust positioning of antenna apparatus, for example by physically rotating or positioning the antenna apparatus in a more appropriate manner, and/or adjust the relative spacing of feed and reflector, for example, returning them to a separation approximately of focal distance and therefore returning to narrow mode, once a link between a user and a base station has been established using the antenna apparatus at the lower gain achieved in the wide beam mode.

It will be appreciated that the approach of generating a broader beam (with lower gain) 300 by placing the antenna feed closer to the reflector or the reflector closer to the antenna feed, may also be utilised in a multi-reflector implementation. In other words, although an arrangement in which an antenna feed is precisely placed at the focal distance of one or more curved reflector results in generation of a narrow beam with good gain illustrated by plot 400 in FIG. 2, it may be advantageous to allow one or more reflector to be closer to the antenna feed than the focal distance, thereby generating a slightly wider beam (such as that illustrated by plot 300), provided that beam provides sufficient gain to overcome or counteract the high path loss and shadowing effects associated, for example, with mmW wave propagation.

It will be appreciated that in the example shown schematically in FIG. 2, the simulated HPBW (Half Power Beam Width) 310 when in wide mode 300 is 22° and the HPBW 410 for narrow mode 400 is 7°, with the result that required beams to cover an initial access field of view can be three times fewer if a feed and reflector are moveable relative to each other and a wide beam option 300 can be used. In simulation, the reflector structure in a mmW antenna apparatus can be moved, for example 10 millimetres, closer to the antenna feed module to support a change between narrow beam mode 400 and wide beam mode 300.

Figure 3:
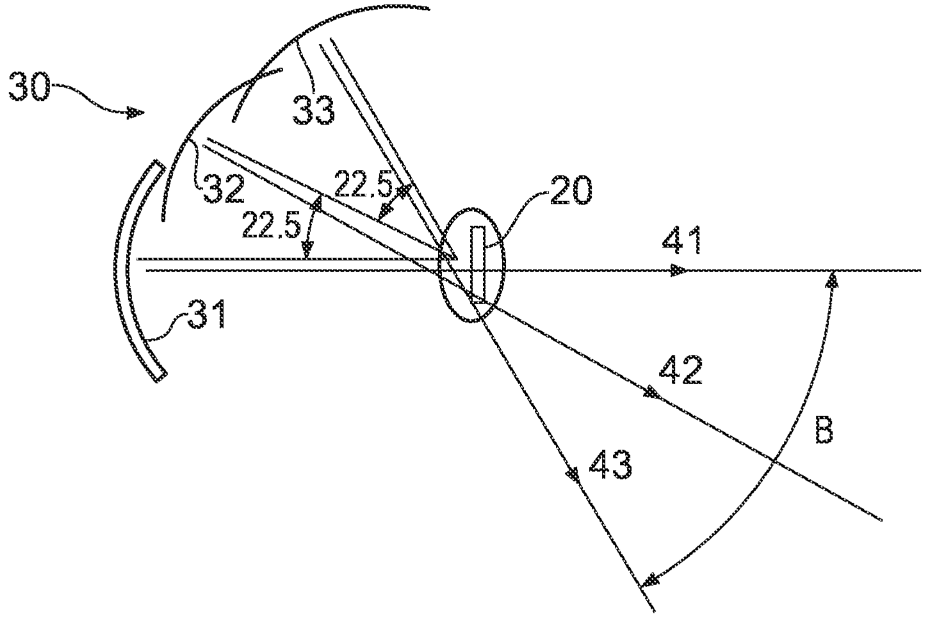
FIG. 3 illustrates schematically an antenna and feed arrangement.

FIG. 3 is a schematic representation in cross-section of an antenna feed 20 and an antenna reflector 30. The reflector 30 is formed from three distinct parabolas 31, 32, 33. In the example shown in FIG. 3, the antenna feed 20 comprises a simple directional feed, in this instance in the form of an antenna element array having a single row of four elements (a 4×1 array feed), which allows a signal to be directed, or energy within a signal to be directed, primarily towards reflector 31, 32 or 33 or a combination thereof.

The nature of each parabola is such that a beam is fixed based on the orientation relative to the feed and the size or curvature of each parabola. Since vertical scanning is needed, an array feed with scanning capability is provided and the different reflector parabolas are located overlapping each other to provide different angles of reflection with respect to the scanning feed.

It will be appreciated that if the antenna feed energy is directed primarily towards reflector 31 it will reflect in the direction labelled 41, if the feed is directed towards reflector 32 it will reflect primarily in the direction labelled 42, and if energy is primarily directed towards reflector 33 it will be reflected in the direction of 43. Each of the parabolic reflectors in the example shown in FIG. 3 may have a common focal distance but have different radiation reflection directions. By providing a reflector 30 formed from multiple components it is possible to increase a field of view supported by an antenna arrangement. In the example arrangement of FIG. 3 the vertical field of view is increased, but a similar arrangement may be implemented in a horizontal or other direction. The overall field of view supportable by a directional feed and reflectors 31, 32 and 33, as shown in FIG. 3 is represented by arrow B.

FIG. 3 and subsequent Figures all relate to possible reflector 30 arrangements. Throughout given arrangements, reflector 30 is formed from multiple reflectors 31, 32, 33, 34. Those reflectors 31, 32, 33,34 forming reflector 30 may be considered to be "sub-reflectors".

The reflector 30 may be considered to be a multi-element reflector, and each sub-reflector 31, 32, 33, 34 may be considered to be an element of the multi-element reflector 30.

Figure 4:
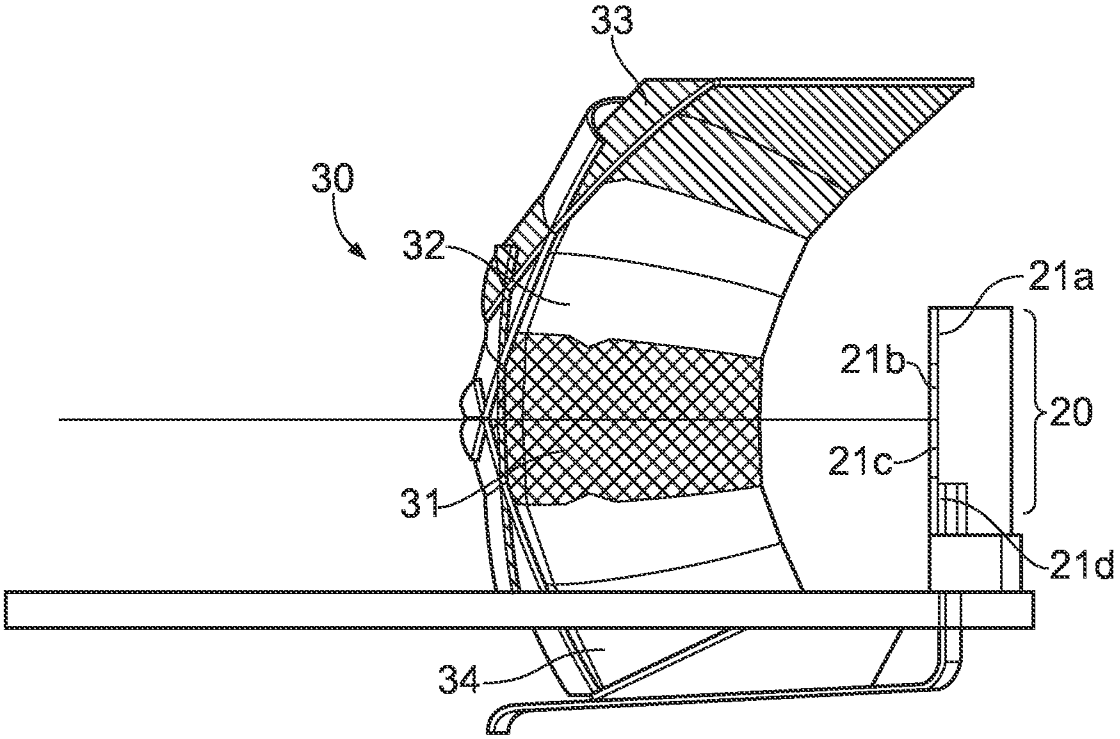
FIG. 4 illustrates schematically one possible antenna arrangement.

FIG. 4 illustrates schematically in more detail an arrangement such as that shown in cross-section in FIG. 3. The antenna feed 20 in FIG. 4 comprises four antenna feed array elements 21A, 21B, 21C and 21D configured to be actively and dynamically controlled by circuitry (not shown). That antenna feed array is configured to be operable to provide a directed radiation beam to the reflector illustrated again generally by number 30. The reflector 30 may itself be formed from a plurality of reflectors, in this case 31, 32, 33 and 34. Each of those reflectors may themselves be a parabola or any other appropriately shaped component which acts to focus and redirect a beam received from the antenna feed. In the example shown in FIG. 4, four different parabolas configured to change radiation direction are provided. Each parabola in the arrangement illustrated has an equal focal distance and an equal parabolic curve. In the arrangement shown, the main direction parabolic reflector 31, which would be operational in the case that a substantially planar wave emanates from feed 20, is primarily shadowed by parabolic reflectors 32 and 34 and parabolic reflector 32 is further shadowed by parabolic reflector 33. In operation, the antenna feed 20 may be configurable to direct a mmW beam towards each of the parabolic reflectors 31 to 34 in order to achieve an increased vertical field of view supportable by antenna apparatus in, for example, a base station deployment.

Figure 5:
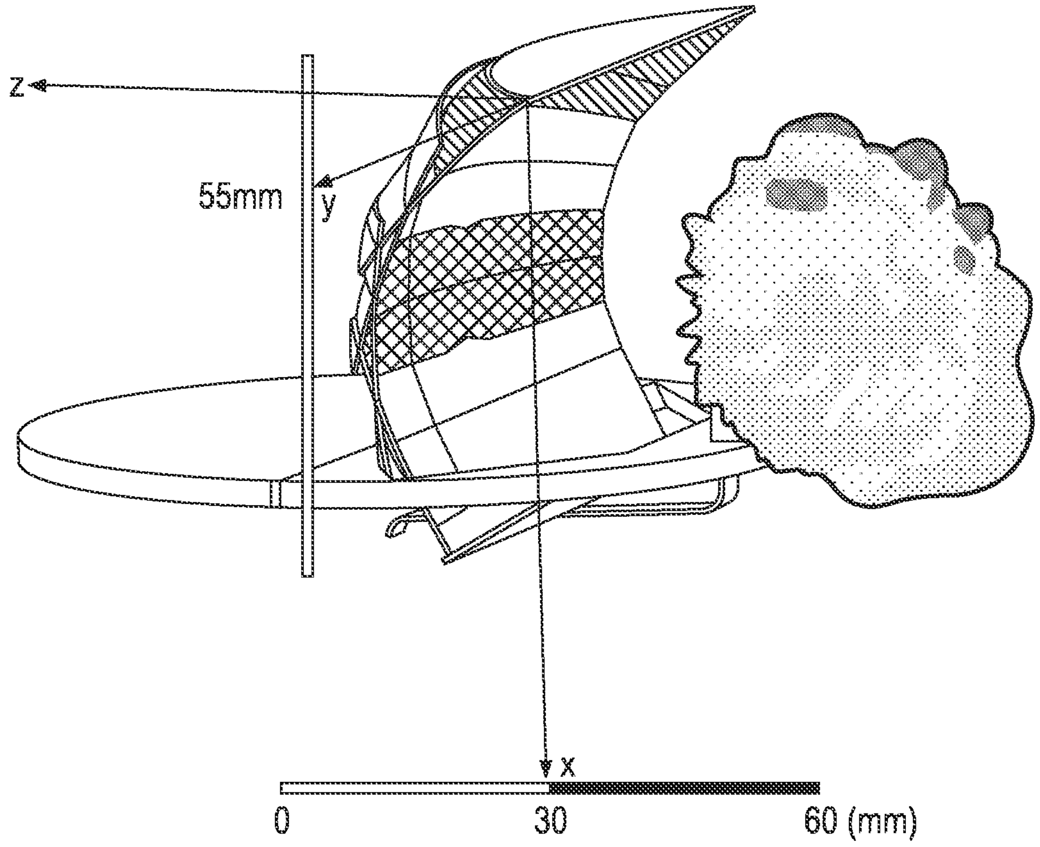
FIG. 5 illustrates schematically one possible antenna arrangement and resulting polarization and gain plots.
Figure 5:
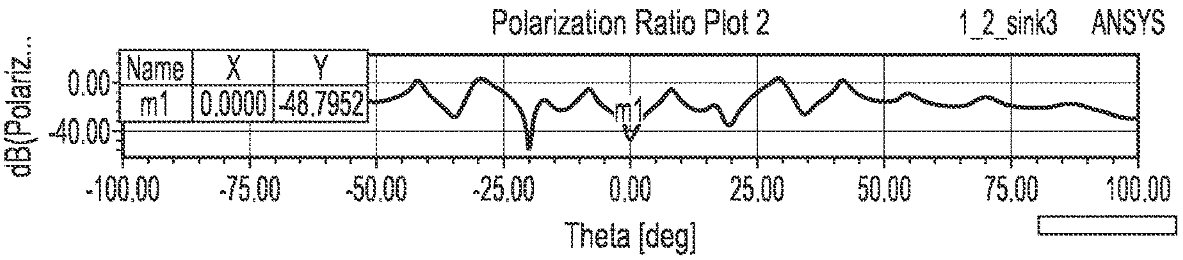
Figure 5:
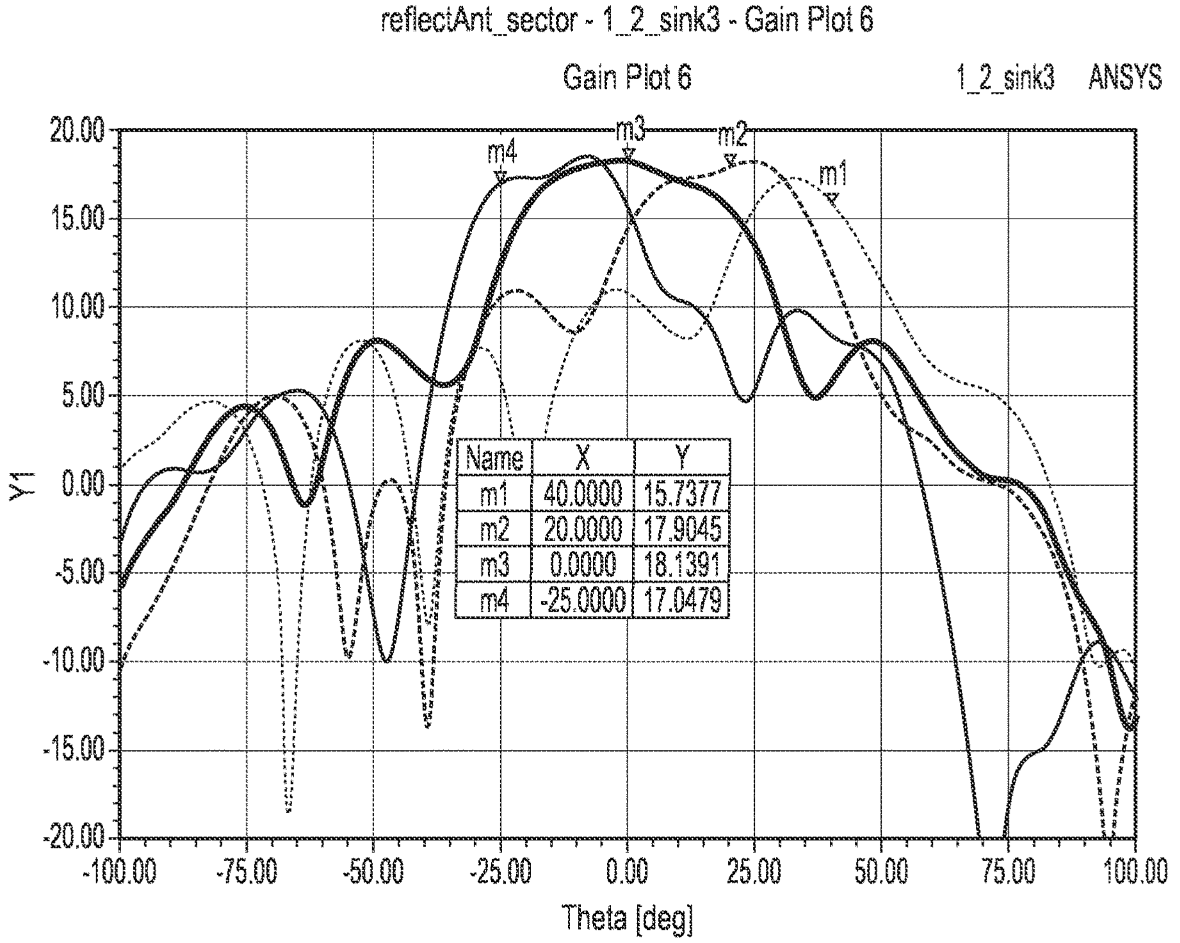

FIG. 5 illustrates the energy, gain and polarization plots of beams which could emanate from a feed and reflector arrangement such as that shown in FIG. 4. It can be seen that the gain obtained from such an arrangement has a significant vertical spread giving an increase in possible field of view, and whilst the structure causes polarization quality to suffer, the effective beam width benefits outweigh that loss in polarization.

Figure 6:
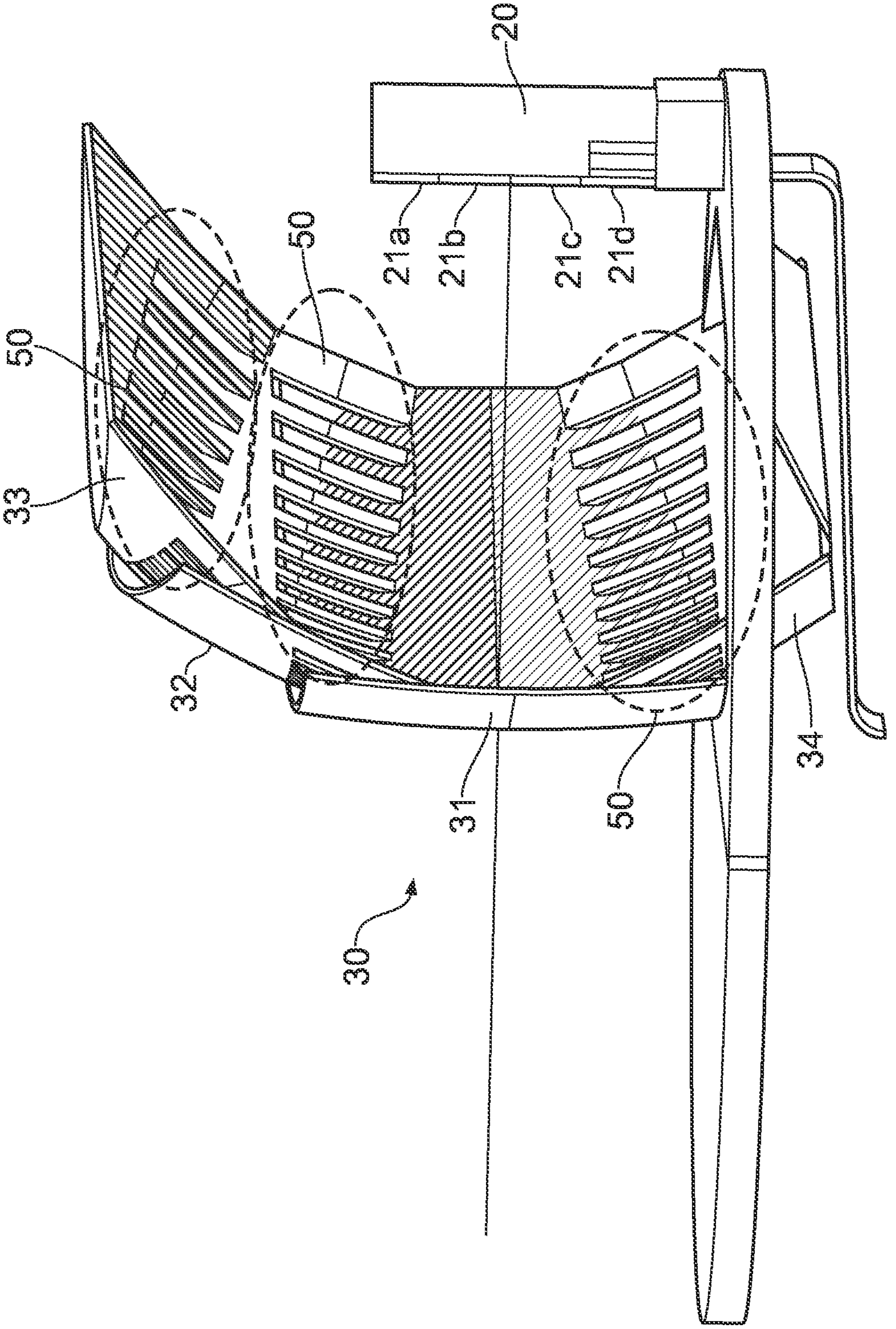
FIG. 6 illustrates schematically one possible antenna configuration.

FIG. 6 illustrates schematically an antenna arrangement. In the arrangement of FIG. 6, the antenna feed 20 takes the form of a feed array having four elements 21A through 21D. The reflector 30 is formed from four parabolic reflectors 31, 32, 33 and 34. In the example shown in FIG. 6, one or more edges between adjacent parabolic reflectors include openings. The openings in the overlapping portions between adjacent parabolic reflectors 31 to 34 take the form of a series of slots or notches provided along an edge of one of a pair of adjacent parabolic reflectors. The slotting or, in this instance, notching, is generally indicated in FIG. 6 within areas 50.

The openings are provided to increase an effective active area of each parabolic reflector visible to a directed feed emanating from the antenna feed 20. In other words, to improve visibility of parabolic reflector 31 to a beam emanating from feed 20 towards that reflector, shadowing parabolic reflectors (32 and 34) include openings in the form of a plurality of slots, open-ended slots, notches and/or enclosed apertures. Inclusion of such openings or apertures increases the visibility or effective visible area of, for example, a particular parabolic reflector to a beam directed toward that particular parabolic reflector by the feed 20. By extending parabolic reflector 32 over parabolic reflector 31, and including openings in the overlapping portion, an effective active area of parabolic reflector 32 can be maintained for cases where the antenna feed 20 is configured to direct a beam towards parabolic reflector 32. Allowing overlap between adjacent parabolic reflectors allows the antenna reflector 30 to be compact, and inclusion of openings in overlap regions between adjacent reflectors allows for a compromise between overall size of a reflector 30 and effective operation of each of the reflectors 31 to 34.

The form, location and arrangement of the openings provided in overlapping regions of reflectors may vary. As described above, the openings may take the form of open-ended slots, or notches, provided along an edge of one of a pair of adjacent parabolic reflectors. The openings may take the form of enclosed apertures. The apertures may take various forms, including, for example, circular apertures, oval apertures, slot apertures, cross-shaped apertures, simple geometric shape apertures or slots, or a combination thereof. The location of the openings provided in overlapping regions of reflectors may also be varied. For example, if overlap between adjacent reflectors comprises a substantially elongate overlap area, the openings may be provided along a central region of that elongate overlap area, such that an area where a beam from an antenna feed is most likely to be directed is provided with an increased "visible" area of a reflector towards which that beam was directed. Openings may be concentrated in the central region of an elongate overlap area, but extend beyond the central region. Openings may increase in dimension, allowing more of a surface of a reflector located beneath an adjacent reflector to be visible, the further from the central region they are determined to be. This means that the visible area of a reflector towards which a beam is directed may increase towards the edges of adjacent reflectors, thereby allowing a smoother gain change over the vertical tilting. In the example shown in FIG. 6, the openings shown take the form of notches along an edge of the parabolic reflectors. The notches shown in FIG. 6 increase in width towards the outer edges of reflector 30. It can be seen that an increased area of surface of reflector 31 can be reached by a beam emanating from feed 20 towards reflector 31 as a result of notches included in the edge of parabolic reflectors 32 and 34.

Figure 7:
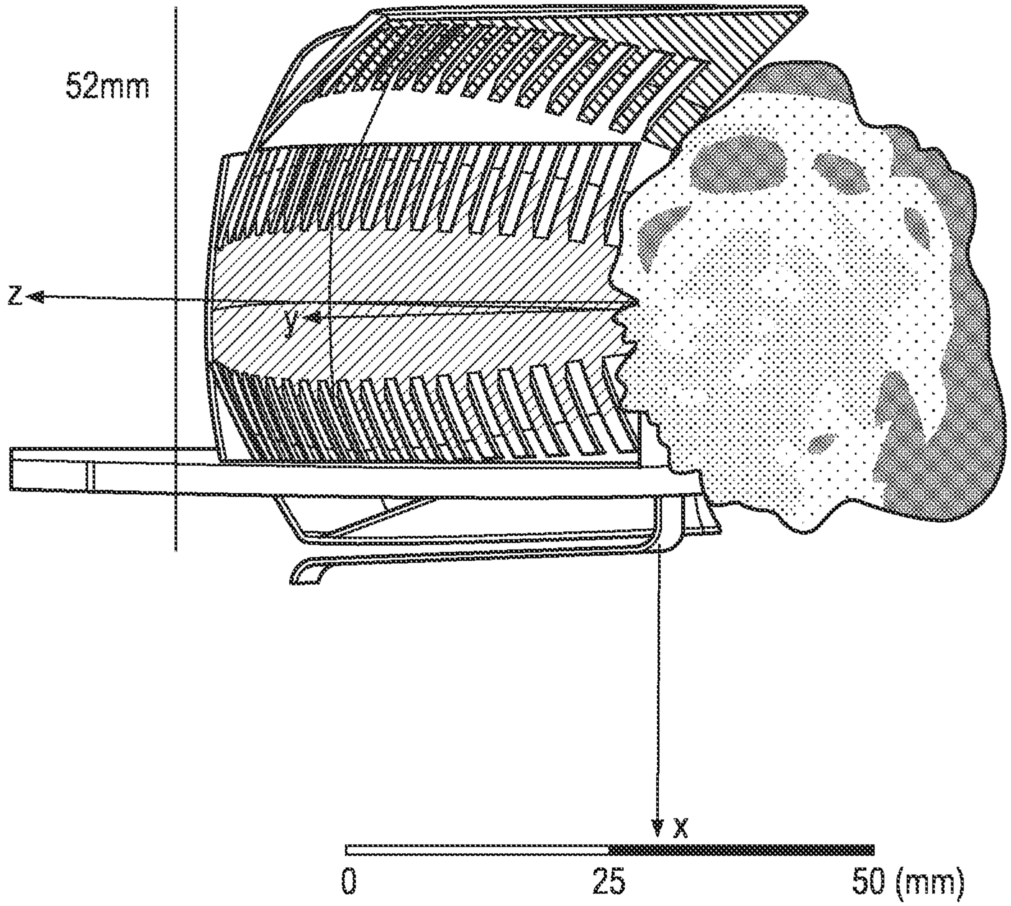
FIG. 7 illustrates schematically one possible antenna configuration and resulting polarization and gain plots.
Figure 7:
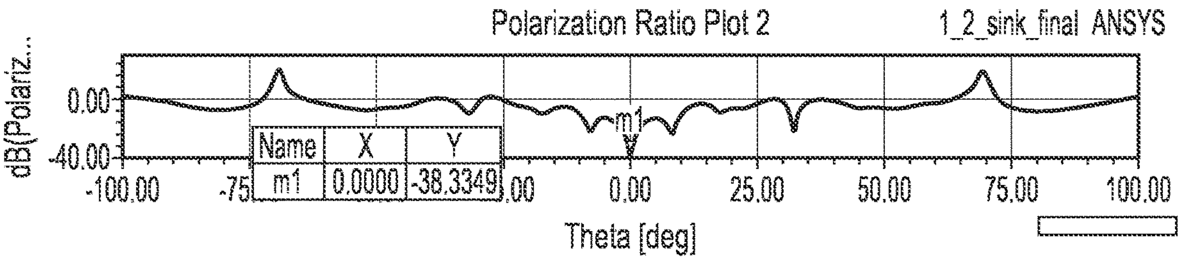
Figure 7:
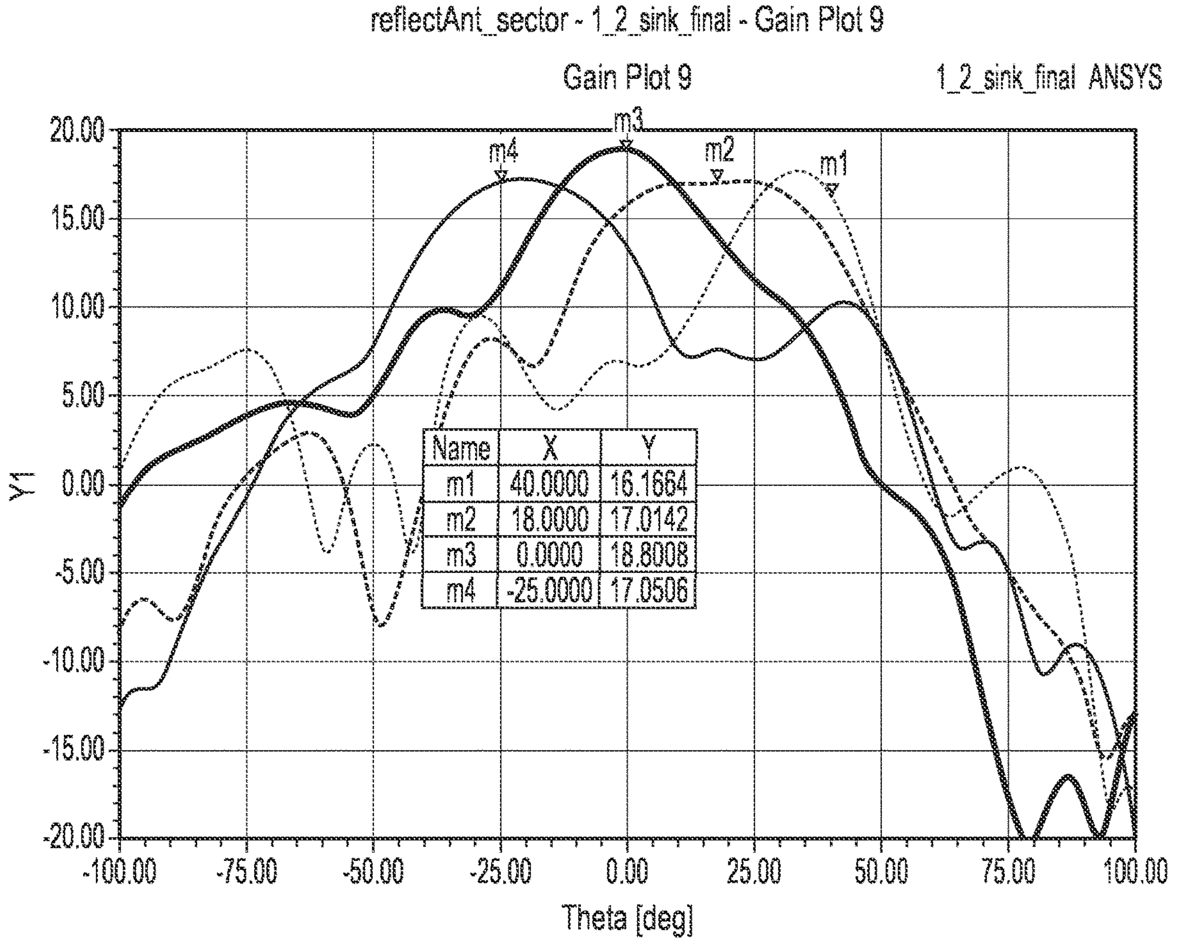

FIG. 7 illustrates energy distribution, gain and polarization ratio plots relating to a beam emanating from an antenna having a form similar to that shown in FIG. 6.

Figure 8:
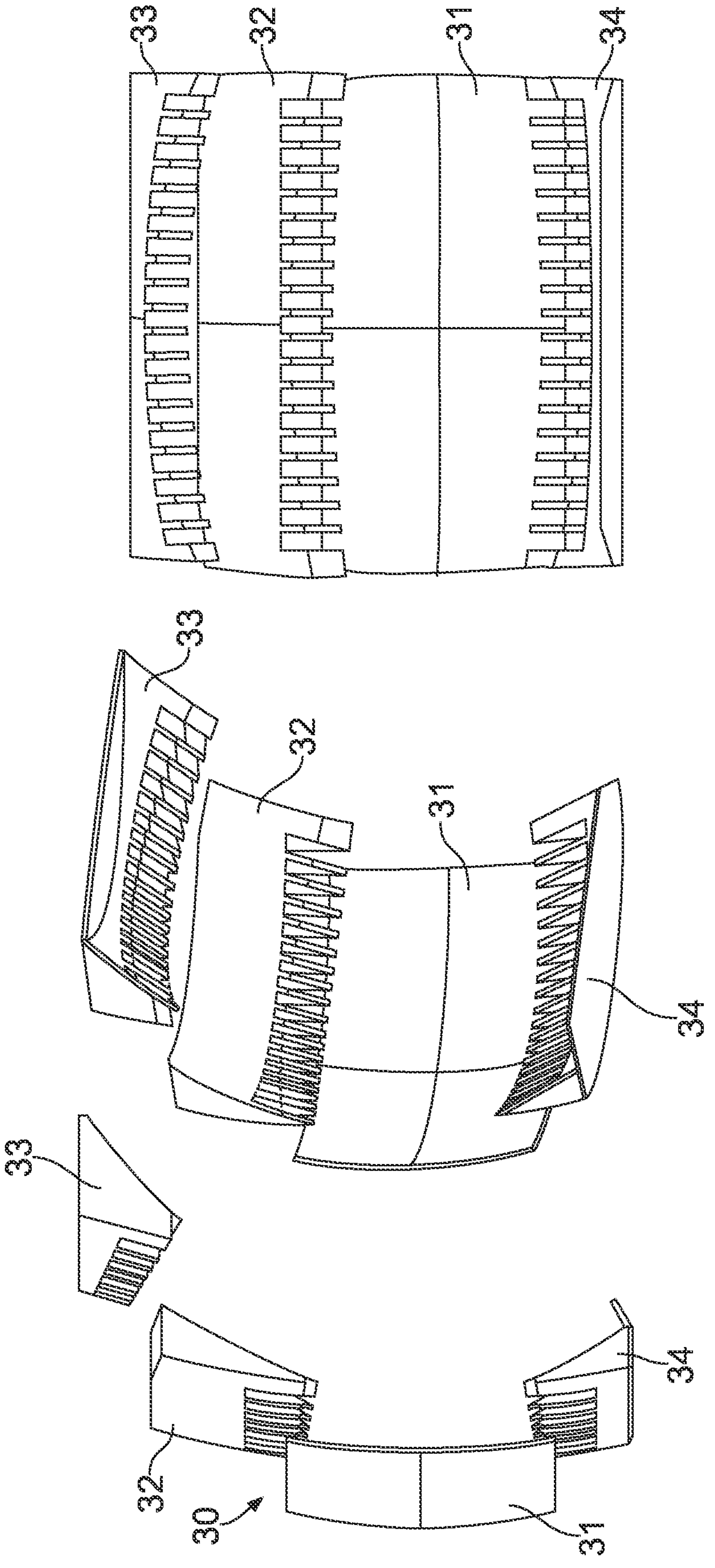
FIG. 8 illustrates schematically components of an antenna reflector according to one arrangement.

FIG. 8 illustrates in more detail one possible reflector arrangement. In this instance, the reflector 30 is formed from four reflector pieces 31, 32, 33 and 34. In an antenna apparatus including a reflector such as that shown in FIG. 8, an antenna feed array (not shown in FIG. 8) is configured to transmit a beam at bore sight (zero degrees) towards parabolic reflector 31. Parabolic reflector 31 is configured to reflect that beam in a first (main) direction in the vertical elevation range.

The antenna feed array can be adjusted to transmit a beam having energy primarily in, for example, a +22.5° direction towards parabolic reflector 32. That reflector is configured such that it reflects the beam in a second direction.

The antenna feed array can be adjusted to transmit a beam having energy primarily in, for example, a +45.0° direction towards parabolic reflector 33. That reflector 33 is configured such that it reflects the beam in a third direction.

The antenna feed array can be adjusted to transmit a beam having energy primarily in, for example, a −22.5° direction towards parabolic reflector 34. That parabolic reflector 34 is configured such that it reflects the beam in a fourth direction.

An initial scan, for example, using an active feed to direct a beam in each of the four directions referred to above, can occur to find a user equipment. Further commissioning and setting up of a base station which has antenna apparatus using reflector apparatus such as that shown in FIG. 8 may be such that the appropriate direction to support one or more users can be identified and sustained. That is to say, one of the directions used in the initialisation phase can be identified as the appropriate one to support a user and that one selected for ongoing base station operation. Usually it will be in initial cell connection phase when different directions are checked. After that, scanning may take place in special cases where a received signal at a user may, for example, be determined to have reached a low threshold value.

Figure 9:
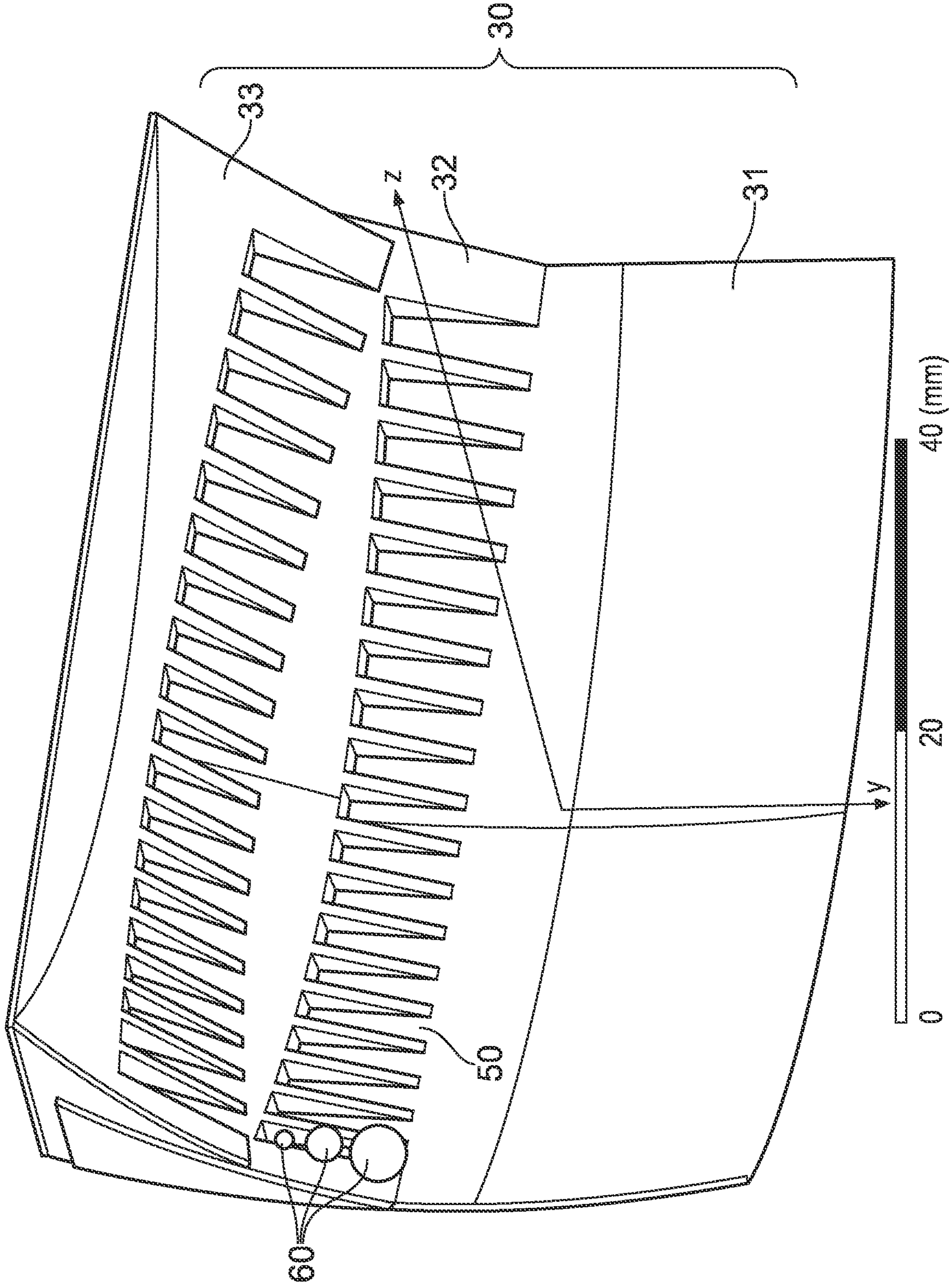
FIG. 9 illustrates schematically some features of an antenna reflector according to one possible arrangement.

FIG. 9 illustrates schematically components of a reflector 30. The reflector 30 is formed from four reflectors 31, 32, 33, 34. Those reflectors 31, 32, 33, 34 together form multi-element reflector 30.

The arrangement of FIG. 9 comprises: a reflector 31, a first shadow reflector 32 and a second shadow reflector 33. Reflector 31 takes the form of a parabolic reflector. It is shadowed by parabolic reflector 32. Parabolic reflector 32 is shadowed by parabolic reflector 33. In order to increase the area of parabolic reflector 31 visible to a beam emanating from an antenna feed, slots, notches 50 or holes 60 can be added to reflector 32. Those openings increase the area of parabolic reflector 31 visible to a beam emanating from the antenna feed array directed towards parabolic reflector 31, and similar slots or holes can be added to reflector 33 to increase the visible area of the reflector 32 when the antenna feed array is configured to send a beam primarily towards reflector 32.

Although described in relation to vertical scanning in terms of a vertical active array feed, and also in terms of a vertical arrangement of reflectors, it will be appreciated that the teaching can also be applied in a horizontal, or off-set scanning direction and that an appropriately dimensioned antenna feed array and, for example, multi-element reflectors can be provided.

In the examples shown throughout FIGS. 4 to 9, the reflectors are shown to be parabolic in the vertical or Y direction but it will be appreciated that each of those reflectors is also curved in the X-Y plane to support a narrow beam in the horizontal direction. Horizontal tuning in the examples shown in FIG. 4 to 9 may be achieved with a motor, since the array feed shown in those examples is 1×4 and a plurality of reflectors are only provided in the vertical direction. Width of field of view can be provided in the horizontal direction by, moving the whole reflector array closer to the feed to provide a wider beam for example as illustrated schematically in FIG. 2, in combination with use of a motor to physically rotate the antenna apparatus.

Whilst described in relation to arrangements which utilise parabolic reflectors, it will be appreciated that reflectors which are substantially parabolic, or which have an appropriate concave reflective surface can be used. Arrangements may be particularly suited to reflectors in which the curvature and focal distance of each reflector is substantially common or shared.

Although the arrangements described are written in terms of a transmission of beams from the antenna feed 20 towards the multi-element reflector 30, it will be appreciated that due to antenna reciprocity, the examples may also be considered in that beams can arrive or be received at the antenna feed 20 via the multi-element reflector 30.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising: a multi-element reflector comprising a plurality of elements, respective ones of the plurality of elements comprising a concave reflective surface, a curvature and a focal distance of the respective ones of the plurality of elements being the same, the concave reflective surface of a respective one of the plurality of elements being configured to steer a radio-frequency beam in a different direction to that of other elements of the plurality of elements, wherein the plurality of elements are located so that an edge of a respective element of the plurality of elements overlaps an edge of an adjacent element so as to result in an elongate overlap region extending along the edges of the respective element of the plurality of elements and the adjacent element; and a directional antenna feed, configurable to direct a beam towards the respective ones of the plurality of elements, wherein the directional antenna feed is positionable (i) in a narrow beam mode to be concurrently spaced from the plurality of elements by the focal distance and (ii) in a wide beam mode to be concurrently spaced from the plurality of elements by less than the focal distance, and wherein the directional antenna feed is configured to be positioned in the wide beam mode while attempting to establish a link between a user device and a base station.

2. The apparatus according to claim 1, wherein the directional antenna feed comprises a plurality of antenna elements configured to form an antenna feed.

3. The apparatus according to claim 1, wherein the directional antenna feed comprises a one-dimensional array of antenna elements.

4. The apparatus according to claim 1, wherein the multi-element reflector is dimensioned to redirect a radio-frequency beam having a frequency above 3 GHz received from the directional antenna feed.

5. The apparatus according to claim 1, wherein the respective ones of the plurality of elements are located immediately adjacent to other respective ones of the plurality of elements.

6. The apparatus according to claim 1, wherein one concave reflective surface of at least one reflective element in the elongate overlap region includes one or more openings through which a concave reflective surface of another element in the overlap region may be accessed.

7. The apparatus according to claim 6, wherein the one or more openings extend along the elongate overlap region.

8. The apparatus according to claim 6, wherein the one or more openings are concentrated in a central region of the elongate overlap region.

9. The apparatus according to claim 8, wherein a dimension of the one or more openings increases based on a distance a respective opening is located from the central region.

10. The apparatus according to claim 6, wherein the one or more openings comprise one or more of: slots, apertures or notches.

11. The apparatus according to claim 1, wherein a distance between the multi-element reflector and the directional antenna feed is adjustable.

12. An electronic device comprising the apparatus according to claim 1.

13. The apparatus according to claim 1, wherein each of the respective ones of the plurality of elements comprises a parabolic reflector.

14. The apparatus according to claim 13, wherein the parabolic reflector of the respective ones of the plurality of elements comprises a same focal distance.

15. A method, comprising providing a multi-element reflector comprising a plurality of elements, respective ones of the plurality of elements comprising a concave reflective surface, a curvature and a focal distance of the respective ones of the plurality of elements being the same; configuring a respective one of the plurality of elements such that the concave reflective surface of the respective one of the plurality of elements steers a radio frequency beam in a different direction to that of other elements of the plurality of elements, wherein the plurality of elements are configured so as to be located so that an edge of a respective element of the plurality of elements overlaps an edge of an adjacent element so as to result in an elongate overlap region extending along the edges of the respective element of the plurality of elements and the adjacent element; providing a directional antenna feed, configurable to direct a beam towards the respective ones of the plurality of elements of the multi-element reflector; and positioning the directional antenna feed to be (i) concurrently spaced from the plurality of elements in a narrow beam mode by the focal distance and (ii) concurrently spaced from the plurality of elements of the multi-element reflector in a wide beam mode by less than the focal distance, wherein the directional antenna feed is positioned in the wide beam mode while attempting to establish a link between a user device and a base station.

16. The method according to claim 15, wherein providing the directional antenna feed comprises providing a one-dimensional array of antenna elements.

17. The method according to claim 15, wherein the respective ones of the plurality of elements are located immediately adjacent to other respective ones of the plurality of elements.

18. The method according to claim 15, wherein one concave reflective surface of at least one reflective element in the elongate overlap region includes one or more openings through which a concave reflective surface of another element in the elongate overlap region is accessible, wherein the one or more openings are concentrated in a central region of the elongate overlap region, and wherein a dimension of the one or more openings increases based on a distance a respective opening is located from the central region.

19. The method according to claim 15, wherein each of the respective ones of the plurality of elements comprises a parabolic reflector.

20. The method according to claim 19, wherein the parabolic reflector of the respective ones of the plurality of elements comprises a same focal distance.

* * * * *